(12) United States Patent
Ambroziak

(10) Patent No.: US 12,160,188 B2
(45) Date of Patent: Dec. 3, 2024

(54) SYSTEM AND METHOD FOR PRODUCING ELECTROMAGNETIC THRUST

(71) Applicant: Jeffrey R. Ambroziak, Guilford, CT (US)

(72) Inventor: Jeffrey R. Ambroziak, Guilford, CT (US)

( * ) Notice: Subject to any disclaimer, the term of this patent is extended or adjusted under 35 U.S.C. 154(b) by 3 days.

(21) Appl. No.: 17/992,885

(22) Filed: Nov. 22, 2022

(65) Prior Publication Data
US 2023/0159188 A1  May 25, 2023

Related U.S. Application Data

(60) Provisional application No. 63/282,282, filed on Nov. 23, 2021.

(51) Int. Cl.
*H02N 11/00* (2006.01)
*B64G 1/40* (2006.01)

(52) U.S. Cl.
CPC ........... *H02N 11/008* (2013.01); *B64G 1/417* (2023.08)

(58) Field of Classification Search
CPC .............................. H02N 11/008; B64G 1/417
See application file for complete search history.

(56) References Cited

U.S. PATENT DOCUMENTS

| | | | |
|---|---|---|---|
| 9,712,031 B2* | 7/2017 | Ensle | B64G 1/417 |
| 2014/0009098 A1* | 1/2014 | Banduric | H02N 11/00 318/558 |
| 2018/0346155 A1* | 12/2018 | Spangelo | B64G 1/44 |

* cited by examiner

*Primary Examiner* — Michael C Zarroli
*Assistant Examiner* — Peter A Taraschi
(74) *Attorney, Agent, or Firm* — RowanTree Law Group, PLLC; Carson C. K. Fincham

(57) ABSTRACT

A method for producing thrust via the asynchronous transmission of current through two generally parallel wires.

7 Claims, 5 Drawing Sheets

SYSTEM AND METHOD FOR PRODUCING ELECTROMAGNETIC THRUST

CROSS REFERENCE TO RELATED APPLICATIONS

This application claims the benefit of U.S. Provisional Patent Application 63/282,282, filed Nov. 23, 2021, entitled "SYSTEM AND METHOD FOR PRODUCING ELECTROMAGNETIC THRUST", the entire disclosure of which is hereby incorporated herein by reference.

FIELD OF THE INVENTION

The present invention relates to systems and methods for producing electromagnetic thrust.

BACKGROUND

Various different technologies are commonly employed to launch rockets into low earth orbit, lunar orbit and on interplanetary missions as well as, in the case of Voyager, interstellar travel. Most commonly, liquid hydrogen and liquid oxygen are combined and ignited to create a controlled explosion pushing mass away from a craft resulting in an equal and opposite force forcing the mass of the craft into space. The great amount of energy released in such an explosion results in the rapid, if relatively brief, acceleration of the craft through the earth's atmosphere and into space. Additional thrusts may be applied to maneuver the craft, to perform subsequent burns of the engines and to slow the craft down when entering orbit around another body.

Because the fuel consumption required for a mission profile requiring achieving earth orbit is so great, there is not left over much fuel to hurl the craft towards a distant planet. Further, as the engines tend to remain dormant for months or even years before decelerating the craft, there exists the danger that the engines will not reignite.

Because the vacuum of space does not retard the motion of a craft traveling through space, it would be advantageous to provide even a small but steady thrust to a craft over an extended period of time. Even a small thrust operating over a long period of time may result in substantial velocity. Towards this end, there have been developed ion thrust engines. An ion thruster or ion drive is a form of electric propulsion used for spacecraft propulsion. It creates thrust by accelerating ions using electricity. While using up only small amounts of mass accelerated to great speeds, such thrusters necessarily use up matter and produce very small amounts of thrust.

There is therefore a need for a system of propulsion that does not require the jettisoning of mass and which provides a measurable amount of thrust for a prolonged period of time.

BRIEF DESCRIPTION OF THE FIGURES

In the figures, which are not necessarily drawn to scale, like numerals may describe substantially similar components throughout the several views. Like numerals having different letter suffixes may represent different instances of substantially similar components. The figures illustrate generally, by way of example, but not by way of limitation, certain embodiments discussed in the present document, where.

DETAILED DESCRIPTION

Figure 1A:
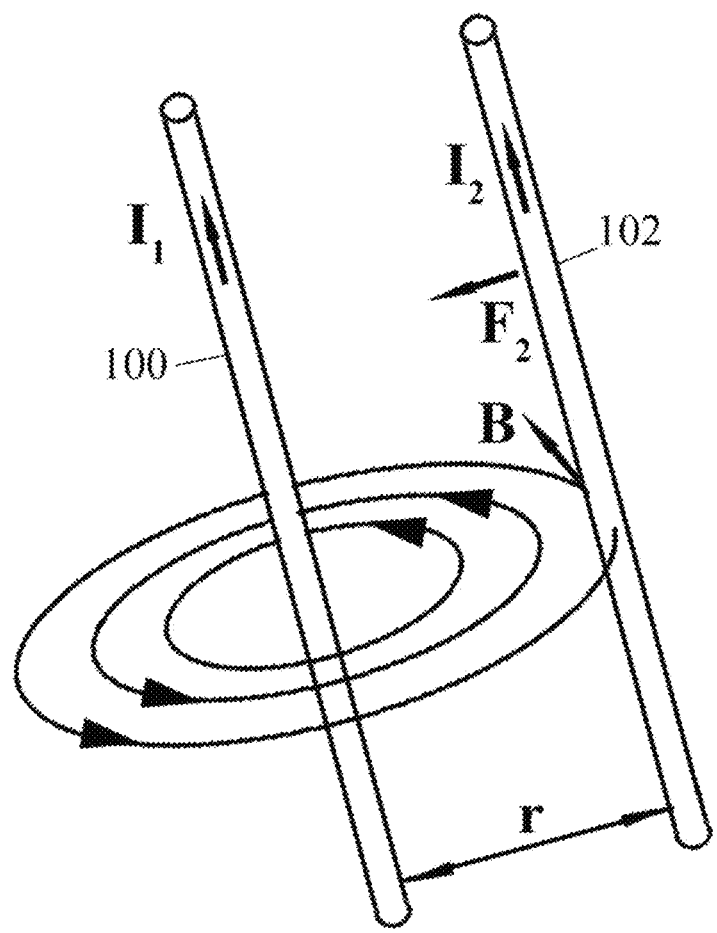
FIG. 1A is an illustration of the physics of current flowing through two wires according to an exemplary and non-limiting embodiment.

With reference to FIG. 1A, there are illustrated two currents, I1 and I2, flowing through two parallel wires separated by a distance r. The value of the magnetic field, B, present at the second wire resulting from I1 in the first wire is given by the equation:

$$B = \frac{\mu_0 I_1}{2\pi r},\qquad\text{equation (1)}$$

where $$\mu_0 = 4\pi \times 10^{-7} \frac{Nm}{A^2}.$$

The force experienced by the second wire directed towards the first wire resulting from I2 flowing through the magnetic field B is given by the following equation:

$$F = I_2 \Delta L B. \qquad\text{equation (2):}$$

Combining equations (1) and (2), the force per unit length (1 meter) acting on the second wire is given by:

$$\frac{F}{\Delta L} = \frac{\mu_0 I_1 I_2}{2\pi r}. \qquad\text{equation (3)}$$

Substituting for $\mu\_0$, gives the following:

$$\frac{F}{\Delta L} = \frac{2 \times 10^{-7} I_1 I_2}{r}. \qquad\text{equation (4)}$$

Performing the same calculations to arrive at the force exerted on the first wire produces a force equal to that of F2 with an opposite direction. As a result, when current is flowing through both wires in the same direction, the wires experience an attractive force. When current is flowing in the opposite direction, the wires experience a repulsive force.

Figure 1B:
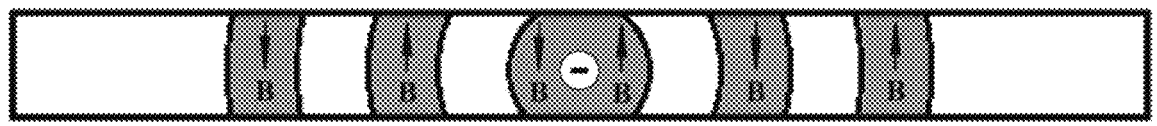
FIG. 1B is an illustration of the propagation of magnetic fields emanating from a wire according to an exemplary and non-limiting embodiment.
Figure 1C:
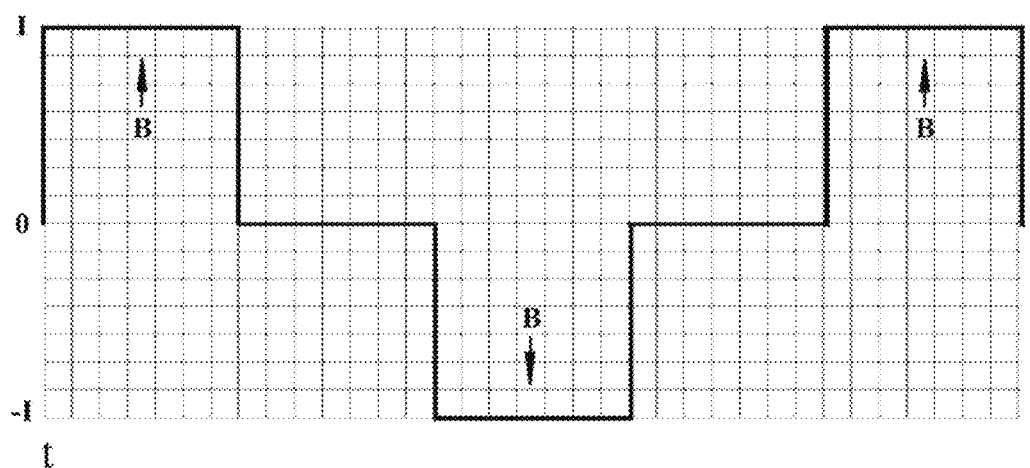
FIG. 1C is an illustration of the propagation of magnetic fields emanating from a wire according to an exemplary and non-limiting embodiment.

With reference to FIG. 1B, there is illustrated an exemplary and non-limiting embodiment illustration of the propagation of a pulsed magnetic field. In accordance with convention, wires shown on end have a "−" designating current coming out of and perpendicular to the page, while an "x" designates current flowing into the page. There is illustrated a cross-section view of the magnetic field, B, propagating in accordance with a current, I, flowing through the wire in a pulsed fashion as illustrated in FIG. 1C. With reference to the magnetic field illustrated propagating to the right and left of the wire, green areas represent portions of a pulse created when current is flowing out of or into the page through the wire.

With reference to FIG. 1C, when current is I and flowing out of the page, a magnetic field, B, is formed propagating to the right of the wire with an upwards orientation perpendicular to the direction of propagation. No magnetic field is produced when there is no current flowing. When current is −I and flowing into the page, a magnetic field, B, is formed propagating to the right of the wire with a downwards orientation perpendicular to the direction of propagation. Magnetic field B propagates at the speed at light at a speed of approximately $3.0 \times 10^8$ m/s. If each pulse lasts for 1 nanosecond, or, $1.0 \times 10^{-9}$ seconds, the width of each pulse is 0.3 meters.

Figure 2A:
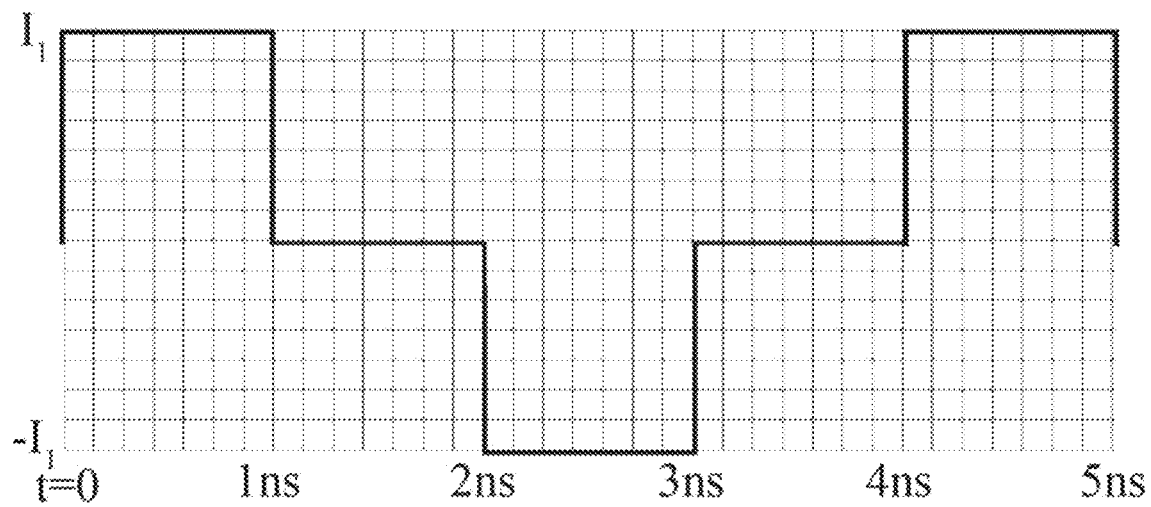
FIGS. 2A-2B are illustrations of the timing of electric current in two wires according to an exemplary and non-limiting embodiment.
Figure 2B:
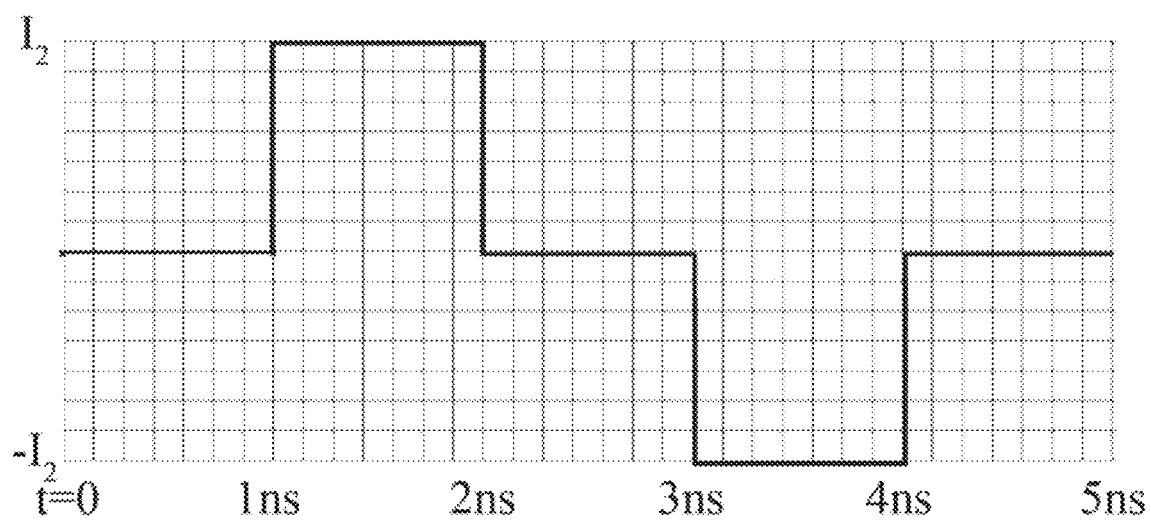

With reference to FIG. 2A, there is illustrated an exemplary graph of current flow through first wire 100. In the example illustrated, the width of each pulse of current is 1 nanosecond and first and second wires 100, 102 are separated by a distance of 0.3 meters. Similarly, FIG. 2B illustrates an exemplary graph of current flow through second wire 102. As each pulse is 0.3 meters in width, each pulse extends for a distance approximately equal to the separation distance of the two wires. When the pulse width and separation distance are approximately equal, each wire during each nanosecond period of time during which current is flowing experiences a force on the wire resulting from the magnetic field generated by the current in the other wire in the preceding period of time. Note that the magnetic field propagated from each wire does not generate any force on the wire that produced the magnetic field. Likewise, for example, the magnetic field B produced by first wire 100 has no effect when passing through second wire 102 if there is no current flowing through second wire 102.

Figure 3A:
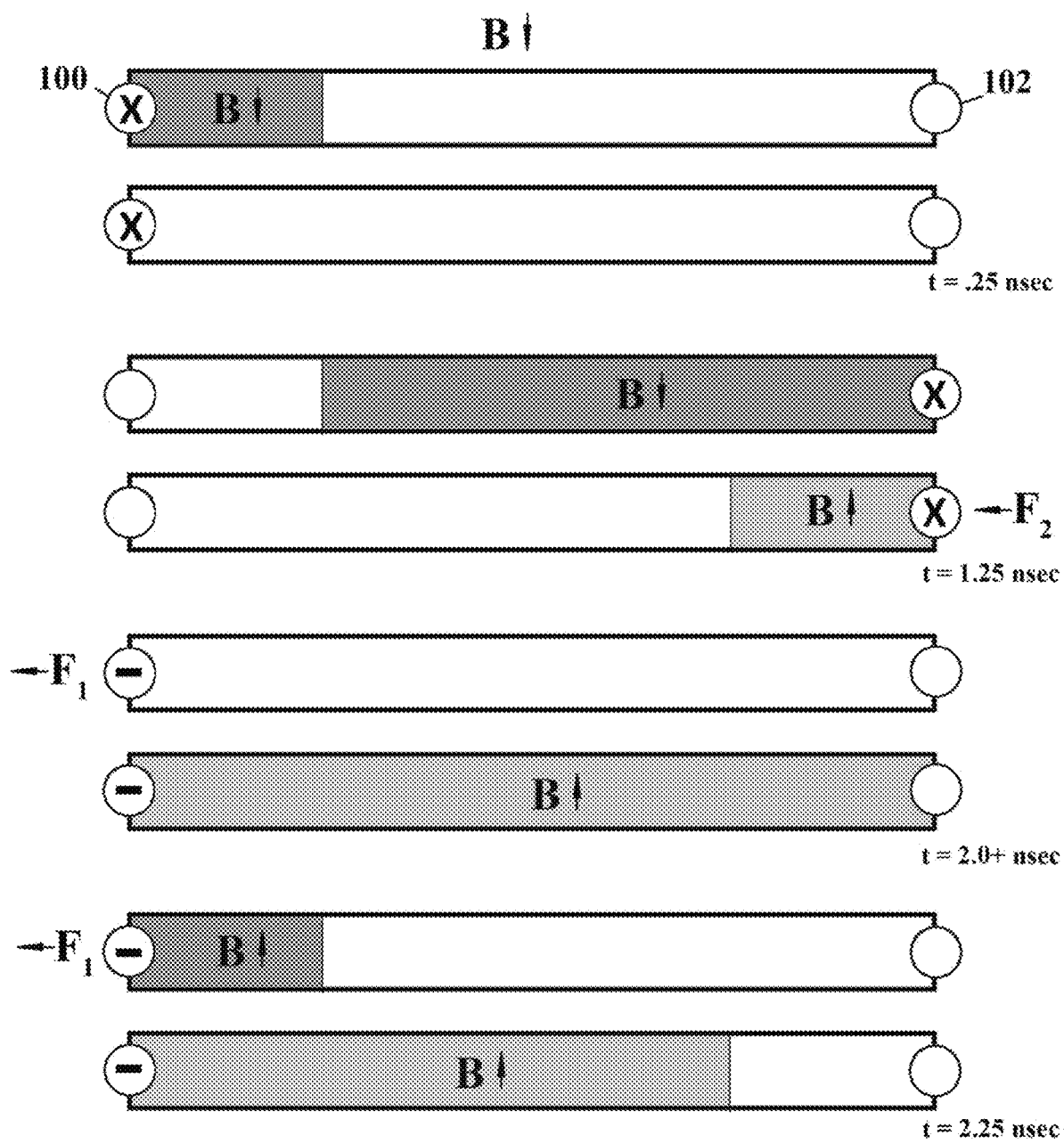
FIGS. 3A-3B are illustrations of the propagation of magnetic fields generated by two wires according to an exemplary and non-limiting embodiment.
Figure 3B:
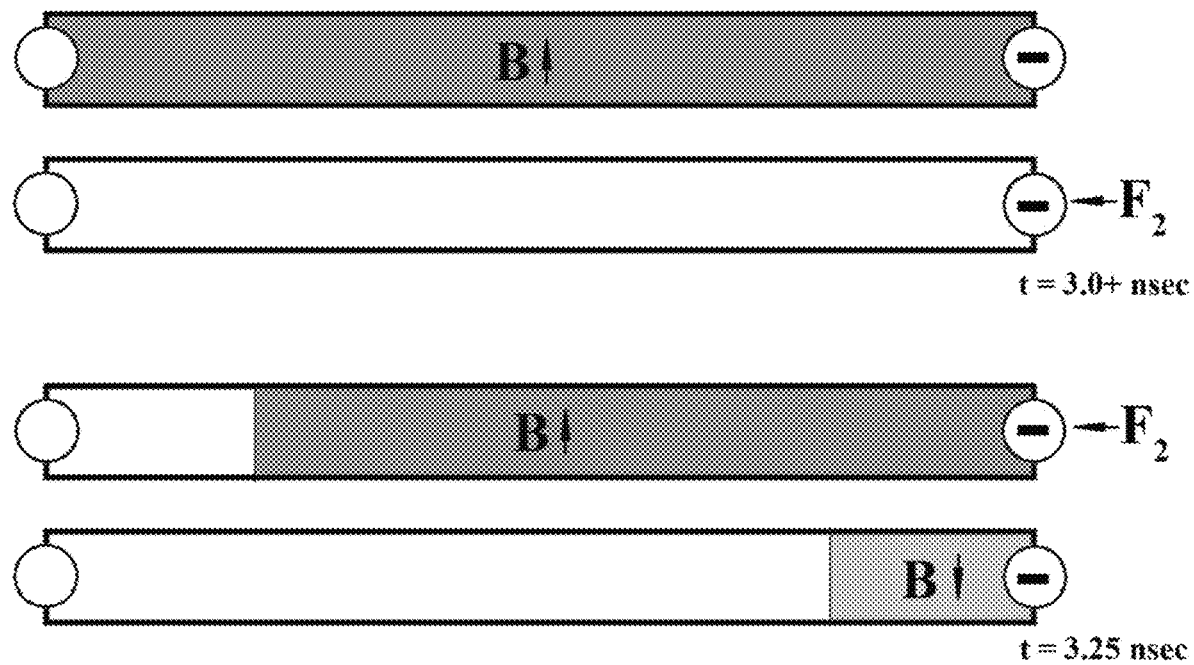

With reference to FIGS. 3A and 3B, there is illustrated the propagation of magnetic fields from each wire towards the other wire at various snapshots in time. As illustrated, at each moment in time, the top rendering of the two shows the magnetic field propagated from the first wire towards the second wire while the lower rendering shows the magnetic field propagated from the second wire towards the first wire. While the two instances of propagation are shown separately, one for each wire in isolation, the magnetic fields propagated by both wires are superimposed and pass through one another like ripples on a pond producing no effect one to the other. At t=0.25 ns, with reference to FIGS. 2A and 2B, the current through the first wire into the page is I1 while there is no current flowing through the second wire. As a result, neither wire experiences any force.

At t=1.25 ns, with reference to FIGS. 2A and 2B, the current through the second wire into the page is I2 while there is no current flowing through the first wire. Meanwhile, one quarter of the magnetic field pulse generate by first wire 100 from t=0 ms to t=1 ns is passing through second wire 102. When this magnetic field interacts with current I2 at second wire 102, a force F2 is generated on second wire 102 pointing to the left side of the page.

At t=2.0+ns (the instant just after t=2.0 ns), with reference to FIGS. 2A and 2B, there is no current flowing through the second wire while a current of −I1 is flowing through the first wire out of the page. Meanwhile, the leading edge of the magnetic field pulse generate by second wire 102 from t=1 ns to t=2 ns is passing through first wire 100. When this magnetic field interacts with current −I1 at first wire 100, a force F1 is generated on first wire 100 likewise pointing to the left side of the page.

At t=2.0+ns (the instant just after t=2.0 ns), with reference to FIGS. 2A and 2B, there is no current flowing through the second wire while a current of −I1 is flowing through the first wire out of the page. Meanwhile, the leading edge of the magnetic field pulse generate by second wire 102 from t=1 ns to t=2 ns is passing through first wire 100. When this magnetic field interacts with current −I1 at first wire 100, a force F1 is generated on first wire 100 likewise pointing to the left side of the page.

At t=2.25 ns, with reference to FIGS. 2A and 2B, there is still no current flowing through the second wire while a current of −I1 continues flowing through the first wire out of the page. Meanwhile, one quarter of the magnetic field pulse generate by second wire 102 from t=1 ns to t=2 ns has passed through first wire 100. As this magnetic field continues to interact with current −I1 at first wire 100, a force F1 continues to be generated on first wire 100 likewise pointing to the left side of the page.

At t=3.0+ns, with reference to FIGS. 2A and 2B, current −I2 has just started flowing out of the page through the second wire while no current is flowing through the first wire. Meanwhile, the leading edge of the magnetic field pulse generate by first wire 100 from t=2 ns to t=3 ns is beginning to pass through second wire 102. As this magnetic field interacts with current −I2 at second wire 102, a force F2 is generated on second wire 102 likewise pointing to the left side of the page.

At t=3.25 ns, with reference to FIGS. 2A and 2B, there is still no current flowing through the first wire while a current of −I2 continues flowing through the second wire out of the page. Meanwhile, one quarter of the magnetic field pulse generate by first wire 100 from t=2 ns to t=3 ns has passed through second wire 102. As this magnetic field continues to interact with current −I2 at second wire 102, a force F2 continues to be generated on second wire 102 likewise pointing to the left side of the page.

Note that when the direction of current in each wire reverses so too does the direction of the magnetic field propagating from each wire. For example, the magnetic field at time t=1.25 ns created by current flowing into the page by second wire 102 at a point between the first and second wires points up on the page as shown by the arrow. Conversely, the magnetic field at time t=3.25 ns created by current flowing out of the page by second wire 102 at a point between the first and second wires points down.

As illustrated and described, during each nanosecond period of time a force F is generated pointing in the same direction by one wire or the other. The force F alternates between the two wires each pulse period. Were both wires to be fixed with respect to one another, the result would be the production of a force providing thrust to any structure incorporating the wires. The equations above are derived assuming parallel wires of infinite length. In some embodiments, the two wires may gently curve in a circular manner that approximates, for a unit length of a meter, two straight parallel wires.

Figure 4:
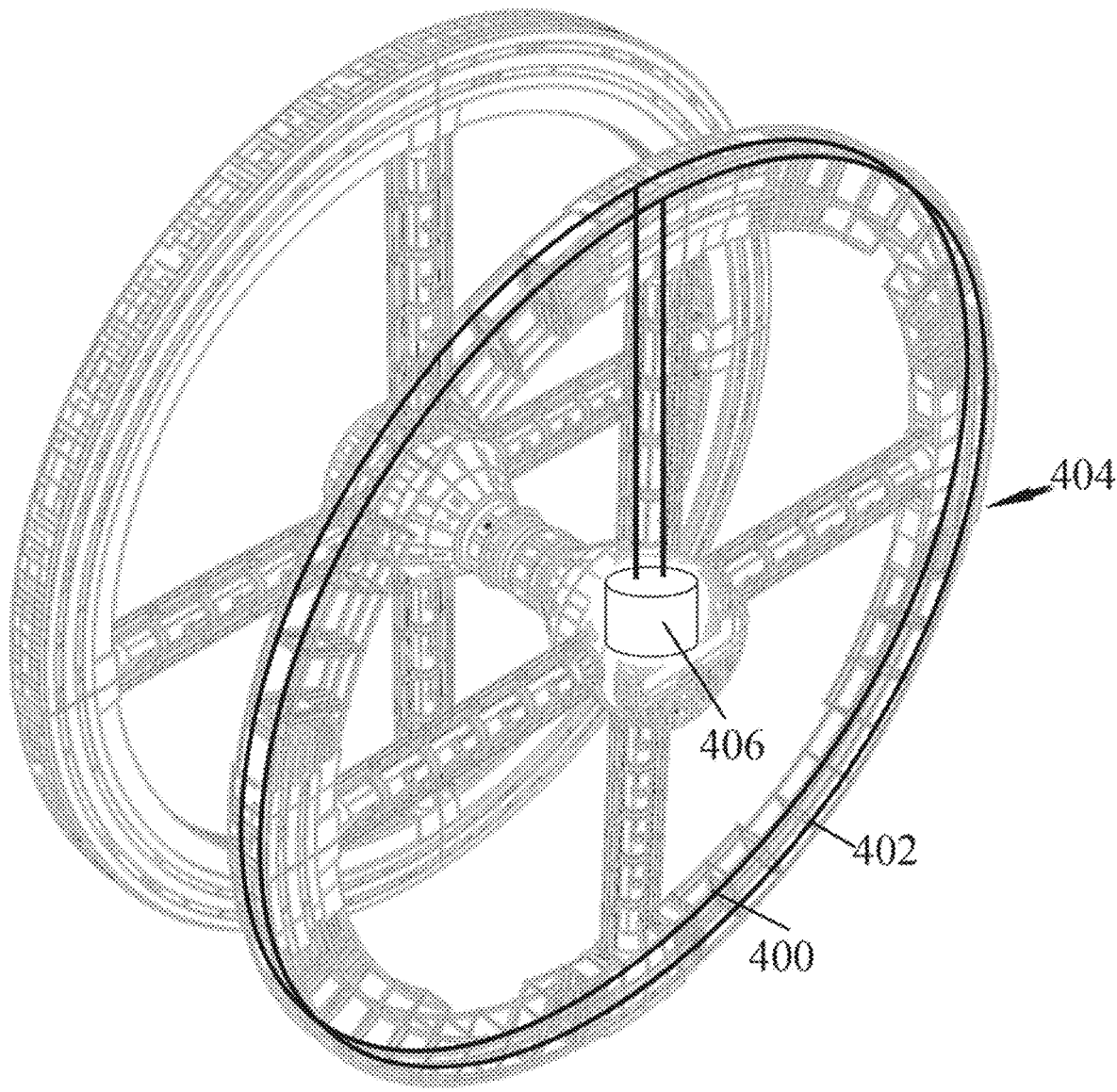
FIG. 4 is an illustration of a spacecraft powered by an electromagnetic thrust propulsion system according to an exemplary and non-limiting embodiment.

With reference to FIG. 4, there is illustrated an exemplary and non-limiting embodiment of a first wire 400 and a second wire 402 extending parallel to one another in a generally circular fashion and forming a part of craft 404. In some embodiments, electrical currents may be produced in both parallel wires 400, 402 in a manner as discussed above to produce a force perpendicular to the circular plane of the wires. As illustrated, a small modular reactor (SMR) 406 may be used to power the device. SMRs are a type of nuclear fission reactor which are smaller than conventional reactors and can produce on the order of 60 MW of power. Relying on nuclear power, SMRs can operate steadily for prolonged periods of time. In some embodiments, the wires may be formed of superconductors exhibiting no resistance and increasing the current flow attainable through the wires. In some embodiments, the superconducting material may be formed, at least in part, of metallic hydrogen.

In the following example, there is computed the thrust potential of such a configuration wherein the craft 404 has a mass approximately equal to that of a locomotive engine, or approximately $1.9 \times 10^5$ kg. In this example, the wires form circles having a diameter of 30 meters and the wires are 0.3 meters apart. The current signal for each wire is as described above with a pulsed current of $+/- 2 \times 10^3$ A. In addition to the singularly illustrated wire setup comprised of the first wire 400 and second wire 402, the setup is replicated 10 times.

In accordance with equation (4), the force F per meter of wire generated by each wire of the system is:

$$\frac{2 \times 10^{-7} I_1 I_2}{r} = \frac{2 \times 10^{-7}(2 \times 10^3)(2 \times 10^3)}{.3}$$

which equates to: 2.67 N per meter of wire. The length of each wire is approximately $2\pi d$ where d is 30 meters, or, 188 meters. Multiplying the force per meter by 188 meters equals 502 N of force per wire. Multiplying this by 10 engines provides 5020 N of force on the craft. In accordance with a=F/m, the acceleration produced by this force on the craft is approximately $5.02 \times 10^3 / 1.9 \times 10^5$ kg which equals $2.64 \times 10^{-2}$ m/sec2.

The distance from earth to mars is approximately $5.46 \times 10^{10}$ meters. Half of this distance is approximately $2.73 \times 10^{10}$ meters.

The amount of time required to traverse a distance $\Delta x$ is 0.5 at2+v0t. If starting from rest with v0=0, $\Delta x$=0.5 at2. As a result, $$\Delta t = \sqrt{\frac{2\Delta x}{a}} = \sqrt{\frac{2(2.73 \times 10^{10})}{2.64 \times 10^{-2}}} = 1.43 \times 10^6 \text{ seconds.}$$

Divide this duration by $8.64 \times 10^4$ sec/day and the result is 16 days. As a result, from a standstill, the craft could accelerate at a constant rate for 16 days, rotate 180 degrees and decelerate at the same rate for an additional 16 days before coming to rest in orbit around Mars. In addition to its use in interplanetary or interstellar travel, the method of electromagnetic propulsion described herein may be used, for example, to aid in satellites maintaining their orbits in the face of orbit degradation such as may be caused by friction with the atmosphere.

What is claimed is:

1. A method for producing thrust comprising:
   transmitting through a first wire a first current defined by a first waveform comprising a positive current value, I1, for a first period of time, no current for a second period of time, a negative current value, −I1, for a third period of time and no current for a fourth period of time, wherein the first period, the second period, the third period and the fourth period are all approximately equal in duration, wherein the first waveform repeats itself, and wherein the first wire is affixed to a substrate; and
   transmitting through a second wire a second current defined by a second waveform comprising the first waveform time shifted by an amount of time approximately equal to the first period of time wherein the second wire is affixed to the substrate, is generally parallel to the first wire, and is separated by a distance, d;
   wherein each period of time is approximately equal to an amount of time required for light to travel the distance, d.

2. The method of claim 1, wherein at least one of the first wire and the second wire comprise a superconductor.

3. The method of claim 2, wherein the superconductor comprises metallic hydrogen.

4. The method of claim 1, wherein at least one of the first current and the second current is produced by a nuclear reactor.

5. The method of claim 1, wherein the nuclear reactor is a small modular reactor (SMR).

6. The method of claim 1, wherein the substrate forms a part of a spacecraft.

7. The method of claim 1, wherein both of the first wire and the second wire are bent to form at least a portion of a circle.

\* \* \* \* \*